(12) United States Patent
Borchers

(10) Patent No.: US 6,446,525 B1
(45) Date of Patent: Sep. 10, 2002

(54) SUSPENDED PEDAL SUPPORT

(75) Inventor: Wolf-Dieter Borchers, Remscheid (DE)

(73) Assignee: Ed. Scharwaechter GmbH, Remscheid (DE)

( * ) Notice: Subject to any disclaimer, the term of this patent is extended or adjusted under 35 U.S.C. 154(b) by 0 days.

(21) Appl. No.: 09/673,712

(22) PCT Filed: Mar. 9, 1999

(86) PCT No.: PCT/DE99/00681
§ 371 (c)(1),
(2), (4) Date: Jan. 22, 2001

(87) PCT Pub. No.: WO99/54799
PCT Pub. Date: Oct. 28, 1999

(30) Foreign Application Priority Data

Apr. 21, 1998 (DE) .......................... 198 17 710

(51) Int. Cl.$^7$ ................................. G05G 1/14
(52) U.S. Cl. .............................. 74/512; 74/560; 74/513; 384/428; 403/153
(58) Field of Search .................. 74/512, 560, 513, 74/562.5; 403/153, 154, 166; 384/428

(56) References Cited

U.S. PATENT DOCUMENTS

| 3,765,264 A | * 10/1973 | Bruhn ......................... 74/512 |
| 4,060,144 A | 11/1977 | Teti ............................. 180/77 |
| 4,295,541 A | 10/1981 | Malecha ..................... 180/315 |
| 4,299,137 A | * 11/1981 | Malecha ..................... 74/512 |
| 4,637,741 A | 1/1987 | Gillet ......................... 384/428 |
| 5,588,338 A | * 12/1996 | Carr et al. .................... 74/560 |
| 6,138,802 A | * 10/2000 | McFarlane et al. ....... 192/13 R |
| 6,054,325 A1 | * 12/2001 | Baumann et al. ......... 74/560 X |
| 6,324,939 B1 | * 12/2001 | Cicotte ........................ 74/512 |

FOREIGN PATENT DOCUMENTS

| DE | 4112132 A1 | 10/1991 | |
| DE | 4230980 A1 | * 3/1994 | .................. 74/512 |
| DE | 10031157 C1 | * 10/2001 | .................. 74/512 |
| FR | 2764715 | * 12/1998 | .................. 74/512 |
| GB | 1452822 | 10/1976 | |

* cited by examiner

Primary Examiner—Vinh T. Luong
(74) Attorney, Agent, or Firm—Davidson, Davidson & Kappel, LLC

(57) ABSTRACT

A disengageable pedal support for a foot control unit has a bearing bracket with two bearing arms and one bearing eyelet formed in each, the bearing eyelet having a continuation projecting laterally to the side of that bearing arm and facing the other bearing arm, an annular plain bearing shell in each bearing eyelet continuation having graduations forming graduated supports that have a smaller and a larger internal diameter part, a first suspended pedal supported by the smaller internal diameter parts and pivotable around an axis, and a second suspended pedal supported by the larger internal diameter parts, pivotable around the axis and suspended beside the first pedal. The support of one of the two pedals is designed as a plug-in support. Each annular plain bearing shell is formed by a molding made of self lubricating plastic material and provided with a radial opening in the larger internal diameter parts.

12 Claims, 3 Drawing Sheets

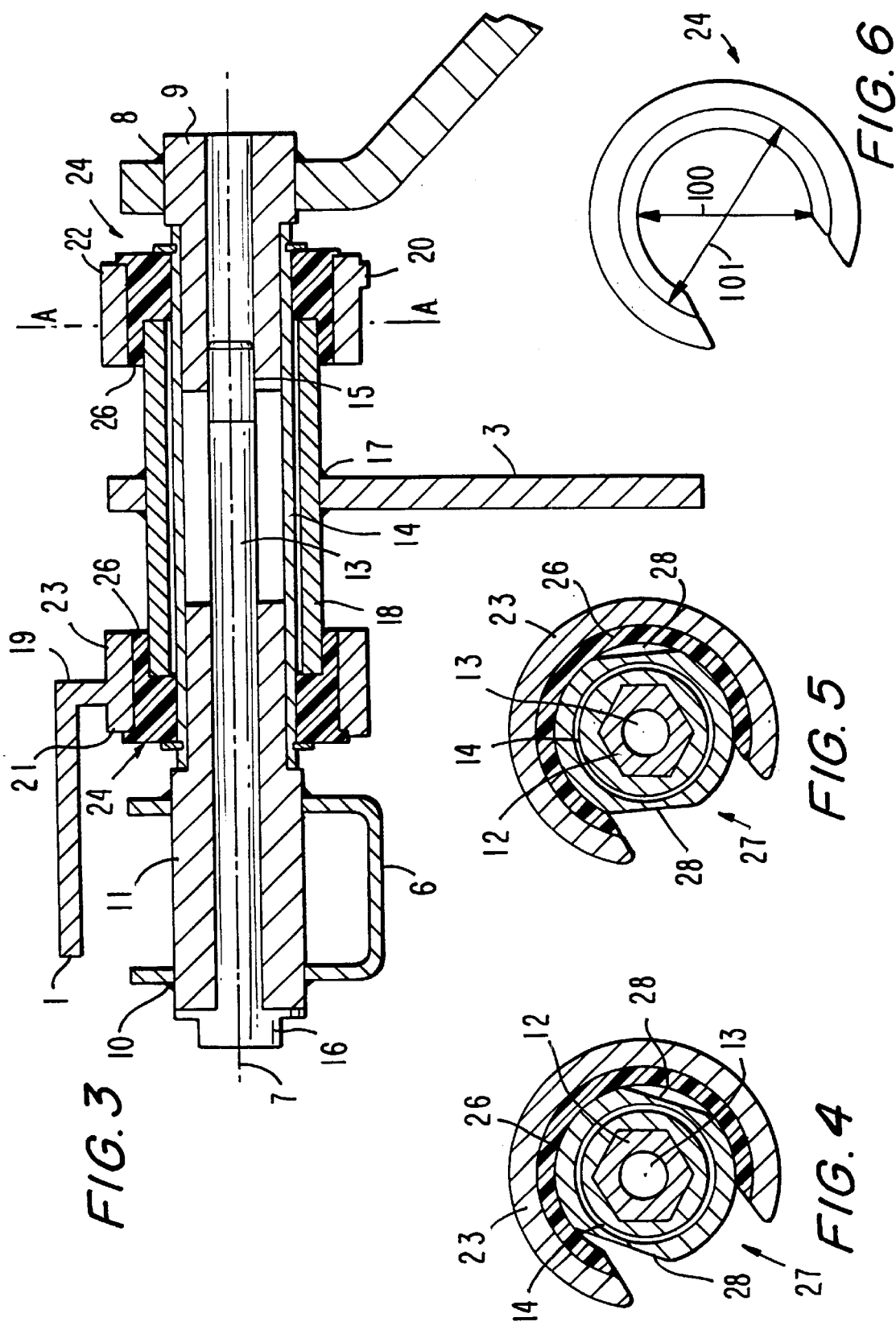

SUSPENDED PEDAL SUPPORT

FIELD OF THE INVENTION

The present invention relates to a disengageable pedal support, in particular for the clutch-actuation pedal in a foot-control unit comprising at least two suspended pedals, in the case of which a brake pedal and a clutch pedal are suspended one beside the other in a common bearing bracket such that they can be pivoted about concentric axes.

BACKGROUND OF THE INVENTION

In the case of known pedal supports of this type, in each case one pedal is mounted on the bearing shaft of the other pedal, as a result of which, when straightforward plain bearings are used for the support of the pedal shafts both on one another and in the bearing arms of the bearing bracket, this may result in the situation, in particular after a period of operation and increasing contamination or the like of the bearing surfaces, where the pedals influence one another to the effect that the actuation of one pedal has the effect of carrying along the other pedal and thus, for example, actuation of the clutch pedal, which is mounted on the bearing shaft of the brake pedal, causes the brake pedal to be adjusted, albeit to a slight extent. Since such carry-along effects obviously have to be ruled out in the interests of it being possible for the control elements of the vehicle to be operated consistently satisfactorily even over a long period of operation and under unfavourable circumstances, a changeover has been made to using antifriction bearings to support the individual pedals and/or the shaft sections assigned thereto both on one another and in the bearing arms of a bearing bracket. Although this measure achieves the desired success in terms of it being possible for the pedals to be actuated smoothly and absolutely independently of one another, it is also associated with the disadvantage of a considerable increase in the production outlay for the foot-control unit, especially since the use of antifriction bearings, in particular needle bearings, makes it necessary to maintain tolerances which are difficult to guarantee in mass production.

SUMMARY OF THE INVENTION

An object of the invention is thus to improve a disengageable pedal support of the type mentioned in the introduction, which is also suitable for right-hand-drive vehicles in particular and is intended for pedals supported about concentric axes, to the effect that, on the one hand, it can easily be installed and removed without there being any need to maintain extremely narrow tolerances and, on the other hand, at the same time the situation where the pedal which is not actuated in each case is influenced or carried along unintentionally by the pedal which has just been actuated in each case is avoided even without the use of antifriction bearings.

This object may be achieved according to the present invention in that a first pedal, forming in particular a brake pedal, and a second pedal, forming in particular a clutch pedal, are mounted in a bearing bracket, which has two bearing arms, such that they can be pivoted independently of one another about concentric axes, via graduated supports formed by annular plain-bearing shells, it being the case that the bearing arms are provided, on their mutually facing sides, with laterally projecting bearing-eyelet continuations which accommodate the graduation, with the larger clear diameter, of the support-forming annular plane-bearing shells, and it also being the case that the support of at least one of the two pedals is designed as a plug-in support. The fact that, in the case of the design according to the invention of the support for the two pedals of a foot-control unit, each of the two pedals can be pivoted about a dedicated axis and is accommodated in dedicated bearings which are fixed in a rotationally secure manner in the respective bearing eyelet of the bearing bracket makes it possible, even when plain bearings are used, to prevent the pedals from influencing one another when one pedal is actuated in each case. Furthermore, the interlinked arrangement according to the invention of the pivot axes which are independent of one another also makes it possible to use single-part bearing shells for the support of the two pedals, with the result that the outlay necessary for the support can be kept low. Finally, as far as the installation and removal of the foot-control unit is concerned, a particular advantage is achieved by the support for at least one of the pedals being designed according to the present invention as a plug-in support, in particular to the effect that said pedal can be installed and removed without the aid of tools.

In a preferred realization of the present invention, it is further provided that the brake pedal is of two-part design, it being the case that a first, pedal-bearing half of the brake pedal is connected in a rotationally secure manner to a first bearing body and a second half of the brake pedal, said half forming the actuator lever for engaging the brake and/or actuating the brake booster, is connected in a rotationally secure manner to a second bearing body, which is spaced apart from the first bearing body, and it being the case that the two bearing bodies are coupled in a rotationally secure manner to one another by means of a polyhedral element engaging in them with a form fit, and are each accommodated in the respectively smaller-internal-diameter part of the plain-bearing shells, which are arranged in the two bearing arms of the bearing bracket and form graduated supports. In conjunction with the two-part design of the brake pedal, it is then further provided, as far as the design of the clutch pedal is concerned, in the case of said realization of the invention that by means of a tube which encloses both the first bearing body, connected in a rotationally secure manner to the brake pedal, and the second bearing body, connected to the actuating lever for engaging the brake, said actuating lever being spaced apart from the brake pedal, and which is arranged concentrically with the brake-pedal shaft, formed by the screw-bolt, the clutch pedal is accommodated in the respectively larger-internal-diameter part of the plain-bearing shells, which are arranged in the two bearing arms of the bearing bracket and form graduated supports.

In order to simplify the handling during the installation and removal of the foot-control unit, it may further be provided that the pedal lever of the clutch pedal is connected by means of welding to the tube, which is arranged concentrically with the brake-pedal shaft, to form a rigid unit.

As far as the design of a plug-in support for one of the two pedals of the foot-control unit, preferably for the pedal forming the single-part clutch pedal, is concerned, it is expediently provided that the bearing-eyelet continuations, which are arranged on the mutually facing sides of the bearing arms of the bearing bracket and accommodate the graduation of the support-forming annular plain-bearing shells, said graduation having the larger clear diameter and being assigned to the support of the tube, which forms a rigid unit with the clutch pedal, have a radial opening which is smaller than the external diameter of the tube, which is connected to the clutch pedal. In conjunction with such a design of the bearing eyelets, it is then further recommended that in the region of its two ends, which engage in the bearing-eyelet continuations, which are formed on the bearing arms of the bearing bracket, the tube, which is connected to the clutch pedal to form a rigid unit, is provided with two mutually opposite outer-circumference flattened formations such that the external diameter of the tube, over part of the outer circumference of the latter, is equal to or smaller than the clear width of the radial openings in the bearing-eyelet continuations of the bearing arms of the bearing bracket.

In accordance with the configuration of the bearing eyelets of the bearing bracket, in terms of the design or configuration of the plain bearings, which form the supports of the pedal support, it is provided that also the plain-bearing shells, which are arranged in the bearing eyelets of the bearing arms of the bearing bracket, have a radial opening in their region having the larger clear diameter which corresponds to the clear width of the radial opening of the bearing-eyelet continuations of the bearing arms of the bearing bracket.

The arrangement of the clutch-pedal-supporting tube within the pedal support is such that in relation to the radial openings in the bearing-eyelet continuations of the bearing arms and the radial openings in the plain-bearing shells, the two flattened formations of the external diameter of the clutch-pedal-supporting tube are arranged in a range which is located outside the normal-operation pivoting-angle range of the clutch-pedal support, such that the clutch pedal can only be released from its supports in a position in which it has been pivoted beyond its normal-operation pivoting-angle range.

In a further expedient single configuration, it may also be provided, as far as the design of a bearing spindle for the two-part brake pedal is concerned, that the first bearing body, which supports the brake pedal, and the second bearing body, which is spaced apart from the first bearing body and supports the actuating lever, are braced against the two end sides of a spacer sleeve by means of a screw-bolt passing through them, it being the case that the first bearing body, which supports the brake pedal, is provided with an internal thread and the head of the screw-bolt engages over the outer end side of the bearing body which supports the actuating lever. In the case of such a configuration, the two bearing bodies expediently have the spacer sleeve engaging over part of their length such that the spacer sleeve at the same time engages over those length sections of the two bearing bodies which pass through the bearing eyelets in the bearing bracket and thus, by way of its outercircumference surfaces, forms the bearing surfaces of a brake-pedal bearing shaft.

Finally, a further feature of the present invention is that the plain-bearing shells, which are arranged in the bearing arms of the bearing bracket, are each formed by a moulding made of a self-lubricating plastic material, and are provided with a radially directed opening merely in their graduated region assigned to the larger diameter.

BRIEF DESCRIPTION OF THE DRAWINGS

The present invention will be described in detail in the following description of examples with reference to an exemplary embodiment illustrated in the drawing, in which:

FIG. 3 shows a longitudinal section through the support of the two large pedals of the foot-control unit according to FIG. 1;

FIG. 4 shows a cross section along the line A—A in FIG. 3 through the support of the two large pedals with the clutch pedal located in its normal position; and FIG. 5 shows a cross section along the line A—A in FIG. 3 through the support of the two large pedals with the clutch pedal located in its pushed-down position.

FIG. 6 shows an annular plain-bearing shell as contained in FIGS. 4 and 5.

DETAILED DESCRIPTION

Figure 1:
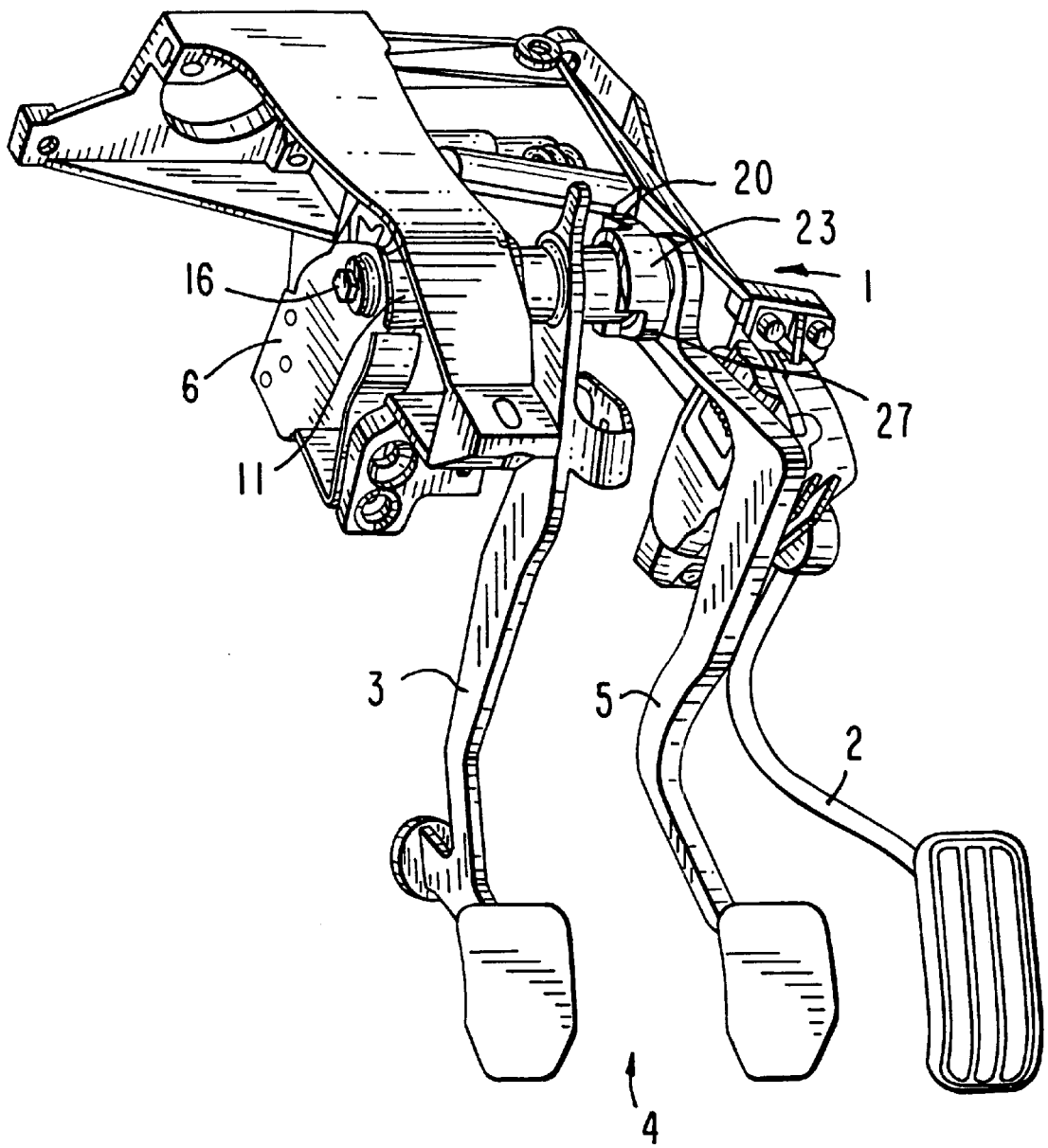
FIG. 1 shows a schematic illustration of a foot-control unit for a right-hand-drive vehicle, said unit comprising two large pedals.

The foot-control unit for a right-hand-drive vehicle which is shown in its entirety in FIG. 1 mainly comprises a bearing bracket 1, an accelerator pedal 2, a clutch pedal 3 and a brake pedal 4, the brake pedal 4 being of two-part design and comprising a pedal arm 5 and an actuating lever 6 which interacts with a brake booster (not illustrated specifically in the drawing). It can also be seen from FIG. 1 of the drawing that at least the clutch pedal 3 and the two parts 5 and 6 of the brake pedal 4 are mounted in the bearing bracket 1 such that they can be pivoted about concentric axes 7 (see FIG. 3).

Figure 2:
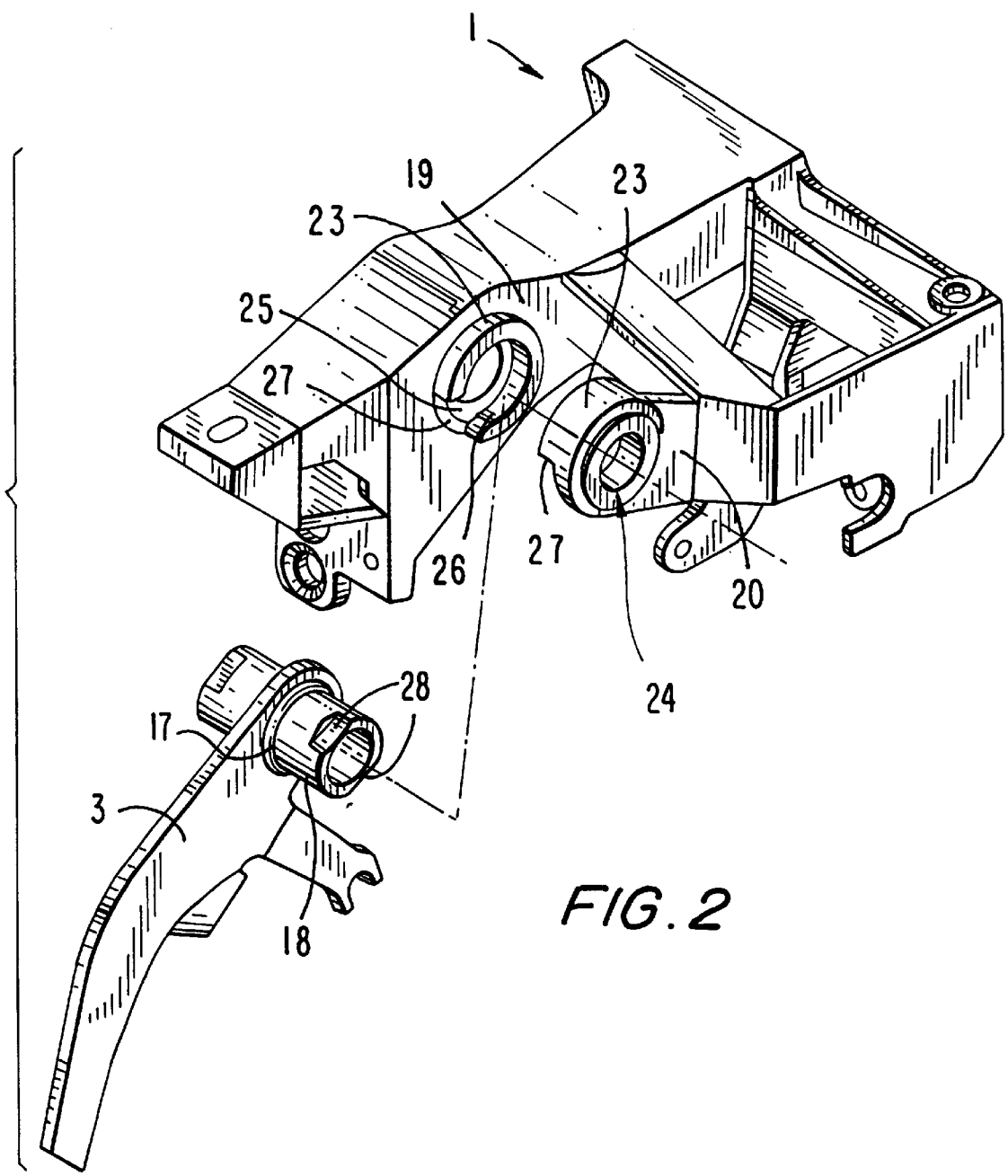
FIG. 2 shows an exploded illustration of the support for the clutch pedal.

As can be seen, in particular, from the illustration of FIG. 3, the first half of the brake pedal 4, said half being formed by the pedal lever 5, is connected by means of welding 8 in a rotationally secure manner to a first bearing body 9, while the actuating lever 6, which forms the second half of the brake pedal 4 and interacts with a brake booster (not illustrated specifically in the drawing), is likewise connected by means of welding 10 in a rotationally secure manner to a second bearing body 11, which is spaced apart axially from the bearing body 9 of the first brake-pedal half 5. The two bearing bodies 9 and 11 of the brake-pedal support are coupled in a rotationally secure manner to one another by means of polyhedral elements 12 engaging in them with a form fit and of a screw-bolt 13 passing through them. In the embodiment shown, the first bearing body 9, which supports the pedal arm 5, and the second bearing body 11, which supports the actuating lever 6, which is spaced apart from the first bearing body, are braced against the two ends of a spacer sleeve 14, to form a bearing shaft, by means of the screw-bolt 13 passing through them. The first bearing body 9, which supports the pedal arm 5, is provided with an internal thread 15, which is assigned to the screw-bolt 13, while the screw-bolt 13, on the other hand, has a head 16 engaging over the end side of the bearing body 11, which supports the actuating lever 6. The clutch pedal 3 is connected by means of welding 17 to a tube 18 which engages with play around the bearing shaft of the brake pedal 4, the bearing shaft being formed by the two bearing bodies 9 and 11 and the spacing sleeve 14, and the clutch pedal and tube forming a rigid unit. The two bearing arms 19 and 20 of the bearing bracket 1 are each provided with a bearing eyelet 21 and 22, respectively, the two bearing eyelets 21 and 22 being each provided, on the mutually facing sides of the two bearing arms 19 and 20, with an axially directed bearing-eyelet continuation 23. Identical annular plain-bearing shells 24 which form the supports for the pedals 3 and 4, and have graduated internal diameters, are inserted into the bearing eyelets 21 and 22 and fixed in a rotationally secure manner. In this case, in the region 25 of the bearing eyelets 21 and 22 of the bearing arms 19 and 20 of the bearing bracket 1, the plain-bearing shells have a smaller internal diameter 100, which corresponds to the diameter of the brake shaft which is to be supported, in the exemplary embodiment shown the spacer sleeve 14, while, in their region 26 assigned to the bearing-eyelet continuations 23, said plain-bearing shells have a larger internal diameter 101, which corresponds to the external diameter of the tube 18, which is connected to the clutch pedal 3 to form a rigid unit. As can be seen, in particular, in FIGS. 4 and 5, the bearing-eyelet continuations 23 and the regions 26 of the plain-bearing shells, said regions being assigned to said continuations and each having a larger internal diameter, have a radially directed opening 27, of which the clear width is smaller than the external diameter of the tube 18, which is connected to the clutch pedal 3. In the region of its two ends, which engage in the bearing-eyelet continuations 23, which are formed on the bearing arms 19 and 20 of the bearing bracket 1, the tube 18 is provided with two mutually opposite outer-circumference flattened formations 28 such that, in the region of its outer-circumference flattened formations 28, the tube 18 has a diameter which is at most equal to the radial openings 27 of the bearing-eyelet continuations 23 and of the plain-bearing shells. In a position in which it has been pivoted beyond its normal-operation pivoting-angle range, it is thus possible, in the manner shown in FIG. 2, for the clutch pedal, without the aid of any tools, to be drawn out of its support in the bearing bracket 1 and conversely, during installation, to be inserted into its support in the bearing bracket 1.

What is claimed is:

1. A disengageable pedal support for a foot control unit, comprising:
   a bearing bracket with two bearing arms, each of said bearing arms having a bearing eyelet, said bearing eyelet having a bearing eyelet continuation projecting laterally to the side of its assigned bearing arm, which is facing the respective other bearing arm,
   an annular plain bearing shell in each of the bearing eyelet continuations, said annular plain bearing shell having graduations which form graduated supports, said graduated supports each having a smaller internal diameter part and a larger internal diameter part,
   a first suspended pedal which is supported by said smaller internal diameter parts of said graduated supports, said first pedal being pivotable around an axis, and
   a second suspended pedal, which is supported by said larger internal diameter parts of said graduated supports, said second pedal being able to be pivoted around the axis and being suspended besides the first pedal, wherein the support of one of the two pedals is designed as a plug-in support.

2. The disengageable pedal support according to claim 1, wherein the first pedal is a brake pedal and the second pedal is a clutch pedal.

3. The pedal support according to claim 2, wherein the brake pedal is of two part design comprising a first pedal bearing half of the brake pedal, said first half being connected in a rotationally secure manner to a first bearing body, and a second half of the brake pedal, said second half forming an actuator lever for actuating a braking system, said second half being connected in a rotationally secure manner to a second bearing body and said actuating lever being spaced apart from the first half of the brake pedal, said first and second bearing bodies being spaced apart from each other and being coupled in a rotationally secure manner to one another by a polyhedral element engaging in said first and second bearing bodies with a form fit, said first and second bearing bodies each being accommodated in the smaller internal diameter parts of the graduated supports of the annular plain bearing shells.

4. The pedal support according to claim 3, further comprising
   a spacer sleeve,
   a screw bolt provided with a head,
   an internal thread provided at the first bearing body, it being the case that the first and second bearing bodies are braced against the two end sides of the spacer sleeve by the screw bolt passing through said first and second bearing bodies and being engaged with said internal thread of the first bearing body, wherein the head of the screw bolt engages over one end side of the spacer sleeve and wherein the described arrangement of the spacer sleeve, the screw bolt and the two bearing bodies forms a brake pedal shaft.

5. The pedal support according to claim 4, further comprising a tube, which is arranged concentrically with the brake pedal shaft and encloses said brake pedal shaft, wherein said tube is accommodated in the larger internal diameter parts of the graduated supports of the annular plain bearing shells.

6. The pedal support according claim 5, wherein the pedal lever of the clutch pedal is connected to the tube in a rotationally secure manner through welding.

7. The pedal support according to claim 6, further comprising
   radial openings in the bearing eyelet continuations,
   other radial openings in the larger internal diameter parts of the graduations of the annular plain bearing shells, wherein said radial openings in the bearing eyelet continuations and the other radial openings in the larger internal diameter parts have a same diameter inside.

8. The pedal support according to claim 7, wherein the tube has a larger external diameter than the diameter inside of the radial openings.

9. The pedal support according to claim 8, wherein in a region of its two ends, the tube is provided with two mutually opposite outer circumference flattened formations such that an external diameter over said flattened formations is smaller or equal to the clear diameter of the radial openings.

10. The pedal support according to claim 9, wherein in relation to the radial openings, the two flattened formations of the tube which is connected to the clutch pedal are arranged in a range which is located outside a normal operation pivoting angle range of the plug-in support.

11. The pedal support according to claim 1, wherein the annular plain bearing shells are each formed by a molding made of self lubricating plastic material and are provided with a radial opening in the said larger internal diameter parts of said graduations of said annular plain bearing shells.

12. The pedal support according to claim 1, wherein said foot control unit comprises a further pedal.

* * * * *